Figure 1:
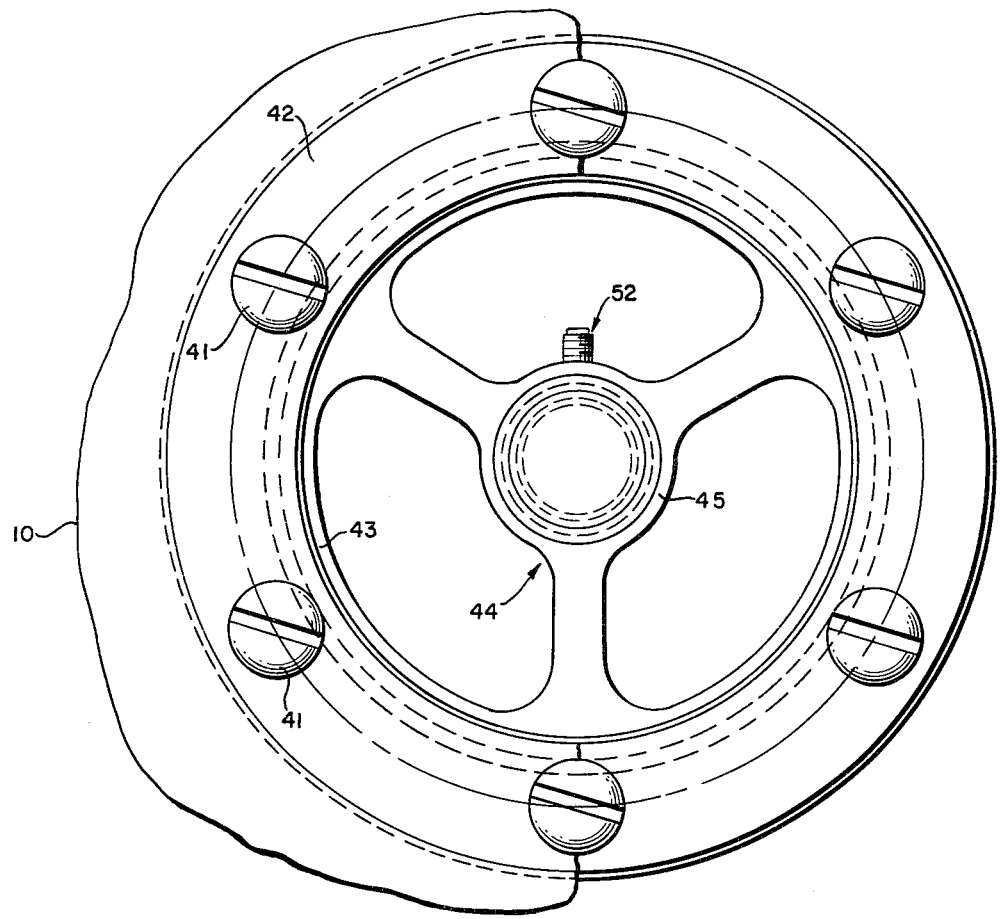

Aug. 10, 1965   J. E. MITCHELL   3,199,524
MAGNETICALLY CONTROLLED EXHALATION VALVE
Filed Feb. 26, 1962

INVENTOR
John E. Mitchell
BY *Herbert M. Birch*
ATTORNEY

United States Patent Office

3,199,524
Patented Aug. 10, 1965

3,199,524
MAGNETICALLY CONTROLLED EXHALATION
VALVE
John Everett Mitchell, Costa Mesa, Calif., assignor to
Robertshaw Controls Company, Richmond, Va., a corporation of Delaware
Filed Feb. 26, 1962, Ser. No. 175,732
10 Claims. (Cl. 137—53)

The present invention relates broadly to pressure responsive valve means and more particularly to an improvement in exhalation valves for use with oxygen or breathing assist masks, helmets, space suits, oxygen tents and the like wherein an exhalation valve is necessary.

Heretofore prior art exhalation valves rely upon mechanically guided movable pressure plates which develop objectionable frictional loading factors to pressure plate movement, whereby precision type action of the valve is interfered with and close tolerances on an opening pressure requirement are not efficiently controlled. Also, with the usual known type exhalation valves, the mating closure parts thereof are formed of materials that water moisture adheres to and even though such parts may be coated with a water resistant lubricant or the like, these valves become locked together by ice deposits with danger to the wearer of the valve carrying unit. For example, a locked valve results in rebreathing excess quantities of carbon dioxide, whereby proper oxygen body levels are impossible. Furthermore, adjustments of prior known exhalation valves have been limited to a single compression spring for desired valve opening pressure, which single adjustment means with mechanically guided valve pressure plates does not provide for spring tolerance versus valve pressure plate position control and therefore this causes the exhalation orifice size to vary in tolerance with the spring adjustment tolerance, whereby close tolerances on opening and closing pressures are not maintained.

It is, accordingly, an object of this invention to eliminate the foregoing discussed disadvantages of prior art exhalation valves.

More specifically, it is an object of this invention to provide a free floating movement for a pressure plate of an exhalation valve by magnetic means, whereby the same is free of frictional loading during movement.

Another object is to provide novel water resistant valve mating surfaces, whereby moisture retention on said surfaces is eliminated and the danger of icing is therefore eliminated.

Yet another object is to maintain close tolerances on valve opening and closing pressures by providing a novelly mounted, magnetically controlled valve, whereby the control magnet thereof is adjustable vertically for high magnetic field accuracy at a given air gap from the magnet to the magnet case rim and whereby the several related parts of the valve with respect to the magnet are vertically adjustable to obtain exhalation orifice size tolerances at all pressures to be controlled to a high degree of precision.

With the above and other objects in view which will more readily appear as the details of the invention are better understood, the same consists in the novel construction, combination, and arrangement of parts, hereinafter more fully described, illustrated and claimed.

Figure 2:
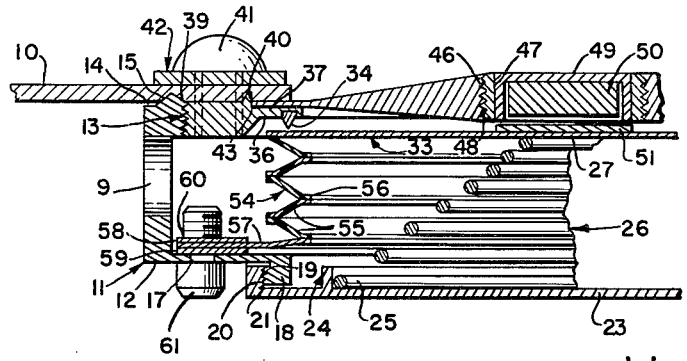

One preferred and practical embodiment of the invention is shown in the accompanying drawing, in which:

FIGURE 1 is a top plan view of the novel exhalation valve with a fragment of the mounting material therefor; and FIGURE 2 is a partial vertical cross section view of the valve to illustrate the several parts thereof.

Similar reference characters designate corresponding parts throughout the figures of the drawing.

Referring in detail to the drawing the valve mounting material 10 may be a portion of any suitable device, such as an oxygen mask, helmet, space suit, tent or the like. In either of the devices noted, the structure of the exhalation valve may be the same. For example, the valve body is formed from a shallow cylinder 11 perforated around its entire circumference with exhaust orifices 9. The cylinder is open at the bottom with a bottom flange 12 and at the top the cylinder 11 is formed around the internal bore with threads 13. Also, the outer rim surface 14 of the top of the cylinder adjacent the threads 13 is formed with a projection 15 for sealing against the under surface of valve mounting material 10, as shown in FIGURE 2.

The bottom flange 12 of the cylinder is provided with a plurality of holes 17 and the flange is formed with an annular enlargement 18, which defines the bore of the bottom opening of the cylinder 11. This enlargement 18 is formed with exterior threads 19, which threads are complementary to internal threads 20 formed around the flange 21 of a bottom cover 23 for the cylinder 11.

The bottom cover 23 on the interior face thereof is provided with an upstanding annular flange 24 adapted to embrace the lower convolution 25 of a conical spring 26.

The upper convolution 27 of the conical spring engages with a pressure plate 33 responsive to the pressures developed by the exhalations of a user of the mask, suit, tent or the like. This plate is held against the edge of an annular blade 34 formed of plastic or like non-absorbent water resistant material, which blade is anchored in a groove formed around the peripheral under face 36 of an annulus ring 37.

This plastic blade holder ring 37 around the peripheral rim thereof is formed with threads 39, which are complementary to the threads 13 formed around the internal bore of the cylinder 11 at the top thereof and thus ring 37 threadedly couples to the top of the cylinder 11. The top surface of the ring or blade holder 37 is formed with an annular projection 40, which like the projection 15 sealingly engages with the mounting material 10, when the same is secured in position by the headed fasteners 41 and the ring gasket 42, see FIGURE 2.

The annular projection 40 serves a dual function in that it also seats against the rim 43 of a spider mount 44 and serves to center the spider in the valve body. The mount comprises a center hub 45 with a threaded bore 46, see FIGURE 2. A magnet holder 47, which is exteriorly formed with threads 48 is threaded in the hub 45. This threaded holder 47 carries a magnet case 49 in which is mounted a magnet 50 and the turning of the threaded holder provides vertical adjustment of the magnet to control the magnetic field of the magnet.

Magnet 50 is of non-polar magnetic material superimposed in spaced vertical alignment directly above an attraction plate or disk 51 carried by the center top surface of the valve plate 33, while the under central side of the plate is biased upwardly by the plate engaging upper convolution 27 of the conical spring 26.

The magnet 50 and its case 49 after a vertical adjustment may be locked into the adjusted position by a set screw 52, see FIGURE 1.

The rim 43 of the spider mount rests on the top surface of the blade holder ring 37, to thereby be sandwiched between this surface and the under edge of the valve mounting material 10 under the ring gasket 42.

The peripheral annular under or bottom surface of the valve plate 33 is secured to the peripheral rim of the upper ring of a bellows 54 made of internally and externally extending Teflon rings 55 and 56. The lower ring of the bellows secures to a Teflon gasket 57, which in turn is secured between gasket rings 58 and 59. These gasket rings are formed with openings 60 similar to openings 17 formed in the bottom flange 12 of the cylinder 11, and are secured in their respective positions by fasteners 61.

Further in regard to the attraction plate 51 centrally mounted on the valve plate 33, this attraction plate is made of a material to be compatible as an attraction plate with the magnet 50. Also, the magnet casing 49 is open at the bottom so the magnet 50 adjacently opposite to the attraction plate is exposed for maximum efficiency in operation.

*Operation*

The foregoing description is believed to make the valve operation clear to others skilled in the art, however, briefly the valve operates by user breathing pressure applied to the valve or pressure plate 33 cemented to the bellows through the spider 44. At predetermined exhalation pressures, the valve plate 33 breaks away from the blade edge of the annular plastic blade or valve seat 34 and exhaust gases are allowed to flow through the valve passage into body 11 and out of the exhaust orifices 9.

During the exhaust action of the valve, the force is equal to the magnetic attraction of the magnet 50 and attraction plate 51 and the resistance of the spring 26 supporting the bellows 54 and/or the gas pressure on the spring side of the bellows.

When the valve plate 33 closes off the exhaust, pressure below opening requirements causes the spring 26 to return the attraction plate 51 to the stronger magnetic field of magnet 50 where the magnetic attraction takes over to close the valve by seating the pressure plate 33 against the blade 34.

All components of the valve unit are adjustably combined to permit minute adjustment of the point of attraction of the bellows assembly with the pressure plate valve secured thereto.

Thus there is provided a novel magnetically controlled valve operable by human exhalation pressures, wherein substantially all frictional loading between the movable components of the valve are eliminated and wherein the parts of the valve are vertically adjustable, so that close tolerance is maintainable at all pressures to be controlled to a high degree of efficiency.

Without further description it is believed that the advantages of the present invention over the prior art are apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. An exhalation pressure operated valve comprising a body portion formed with a plurality of exhaust openings therein, a downwardly directed valve seat supported adjacent the top of the body portion, a valve means having an upper and a lower surface, said valve normally being biased into engagement with said seat, said valve being secured to and supported by a spring extended bellows connected to the lower portion of said body portion and the lower surface of said valve, open frame means mounted in the upper portion of said body portion, magnet means supported in said frame cooperating with said spring extended bellows to positively retain said valve means seated in closed position against said downwardly directed valve seat intermittently between exhalation pressure unseated open position of said valve means, said valve means being disengaged from said valve seat by exhalation pressures on the upper face of said valve whereby said spring extended bellows is partially contracted with each exhalation and permits exhalation exhaust from said exhaust openings, and said valve means having a centrally positioned attraction plate carried thereby below said magnet means, said magnet being vertically adjustable in said frame, to thereby vary the effect of the magnetic field with respect to said attraction plate upon actuation of said valve means by exhalation pressure.

2. An exhalation pressure opened valve, as described in claim 1, wherein said valve means is a pressure plate.

3. An exhalation valve, as described in claim 1, wherein said pressure opened valve seat is a plastic blade V-shaped in cross section having its apex extending downwardly for engagement with the said upper surface of said valve means.

4. An exhalation pressure opened valve, as described in claim 1, wherein said valve means and said valve seat are of water resistant material.

5. An exhalation pressure opened valve comprising a shallow cylindrical body open at the top and bottom and having the side wall thereof perforated with a plurality of openings, the opening at the top of the body having the internal bore adjacent the rim thereof formed with threads, spider means having an exterior threaded rim in threadable engagement with the threads around the internal bore of the body, said spider means having a central hub portion, a magnet mounted in the hub portion, an exhalation responsive pressure plate resiliently and yieldably supported below said spider means and said magnet, said rim of said spider means having an annular water resistant blade secured to the underside thereof, said blade being held engaged with said pressure plate by said magnet between intermittent disengagement of said pressure plate with said blade, a bottom closure for said bottom opening of said body, said upper surface of said closure supporting a conical spring compressed between the bottom of said pressure plate and the upper surface of said closure, a bellows having a bottom annular portion secured to the bottom rim of the body and to the under peripheral surface of said pressure plate, said bellows being positioned concentrically around said spring, and an attraction plate in the magnetic field of said magnet centrally carried by the upper surface of said pressure plate below said magnet normally holding said valve closed until opened by exhalation pressures in excess of the magnetic attraction imparted from said magnet to said plate.

6. An exhalation pressure opened valve comprising a valve body formed of a shallow cylinder, a free floating pressure plate in said cylinder movable by exhalation pressure, an exhalation pressure inlet defined by a valve seat support at the top of said cylinder, a valve seat in said support, said plate being secured to the upper ring of a bellows and engageable with said valve seat, a spring within said bellows normally expanding said bellows and holding said plate in seated position, a plurality of exhalation exhaust openings formed in the wall of the cylinder below said valve seat, a bottom closure means for said cylinder, said closure means being vertically adjustable to control the action of said spring, said valve seat support including a frame vertically adjustable with respect to the said pressure plate, a magnet carried by said frame, said magnet also being vertically adjustable in said frame and with said spring serving to hold said plate engaged with said seat in the absence of exhalation pressures, and an attraction plate secured centrally to the upper surface of said floating pressure plate, whereby close tolerances on valve opening and closing pressures are maintainable by adjustable control of said magnet with respect to said attraction plate.

7. A pressure responsive means for mounting in masks, helmets, space suits, tents or the like requiring an exhalation valve responsive to exhalation pressure of the user comprising a housing, an annular seating means in the housing and a floating pressure responsive plate disengageable with said annular seating means with exhalation of a user, said housing having exhalation exhaust orifices positioned below said seating means, a spider means mounted above said seating means, and a plate control magnet mounted concentrically in said spider means above said pressure responsive plate, said magnet being confined in a vertically adjustable casing in said spider means, whereby the seating means engaging control magnet is vertically adjustable with respect to said pressure responsive plate for high magnetic field accuracy at a given air gap from the magnet so close tolerance is maintainable for all exhalation pressures to a high degree of accuracy.

8. A magnetically controlled exhalation valve responsive to exhalation pressures for use in oxygen masks, helmets, space suits, oxygen tents and the like, including a housing with exhalation exhaust orifice means, valve mating means mounted above said exhaust orifice means, one of said valve mating means being a floating exhalation pressure responsive disk free of frictional loads during movement thereof and the other of said valve mating means being an annular blade V-shaped in cross section, said disk carrying a centrally mounted attraction plate, a magnet mounted on the housing above said attraction plate, a coiled spring in said housing normally biasing said disk to engage with said V-shaped blade to close off said exhaust orifice means and thereby return said attraction plate carried by said disk to the stronger magnetic field of said magnet, whereby magnetic attraction is additive to said spring to maintain valve mating position in the absence of exhalation pressure on said disk.

9. A magnetically closed exhalation valve responsive to exhalation pressures for use in oxygen masks, helmets, space suits, oxygen tents and the like, including a housing with exhalation exhaust orifice means, valve mating means mounted above said exhaust orifice means, one of said valve mating means being a floating exhalation pressure responsive and magnet controlled disk free of frictional loads during movement thereof and the other of said valve mating means being an annular blade V-shaped in cross section disengageable and engageable with said disk by exhalation and magnetic attraction respectively, said pressure responsive disk carrying a centrally mounted magnetic field attraction plate, a magnet mounted on the housing above said attractive plate, a coiled spring in said housing normally biasing said disk to engage with said V-shaped blade to close off said exhaust orifice means and thereby return said attraction plate carried by said disk to the stronger magnetic field of said magnet, whereby magnetic attraction is additive to said spring to maintain valve mating position in the absence of exhalation pressure on said disk and a ring and complementary annular gasket secured around the top rim of said housing adapted to secure said housing to the material of the said masks, helmets, space suits or oxygen tents.

10. An exhalation valve comprising a shallow cylindrical body open at the top and bottom and having the side wall thereof perforated with a plurality of openings, the opening at the top of the body having the internal bore adjacent the rim thereof formed with threads, spider means having an exterior threaded rim in threadable engagement with the threads around the internal bore of the body, said spider means having a central hub portion, a magnet mounted in the hub portion, an exhalation responsive pressure plate, said plate being resiliently and yieldably supported by a spring below said spider means and said magnet, said rim of said spider means having an annular water resistant blade secured to the underside thereof, engaged by the said pressure plate in the absence of exhalation pressure on said plate, a bottom closure for said bottom opening of said body, said closure having an upstanding annular flange for centering said spring, said surface of said closure supporting a conical spring compressed between the bottom of said pressure plate and the upper surface of said closure, a bellows having a bottom annular portion secured to the bottom rim of the body and to the under peripheral surface of said pressure plate, said bellows being positioned concentrically around said spring, and an attraction plate in the magnetic field of said magnet centrally carried by the upper surface of said pressure plate below said magnet normally holding said valve closed until opened by exhalation pressures on said pressure plate in excess of the magnetic attraction imparted from said magnet to said attraction plate.

References Cited by the Examiner

UNITED STATES PATENTS

| | | | |
|---|---|---|---|
| 2,449,683 | 9/48 | Akerman et al. | 137—63 X |
| 2,646,071 | 7/53 | Wagner | 137—528 |
| 2,938,540 | 5/60 | Schatzman et al. | 251—65 X |
| 2,966,917 | 1/61 | Bloom | 137—64 |
| 3,039,481 | 6/62 | Schreiber et al. | 137—64 |
| 3,050,054 | 8/62 | Jones | 137—64 X |

ISADOR WEIL, *Primary Examiner.*

WILLIAM F. O'DEA, *Examiner.*